No. 839,474. PATENTED DEC. 25, 1906.
W. S. GUINTER.
COMBINED FENCE MAKING TOOL.
APPLICATION FILED OCT. 23, 1906.
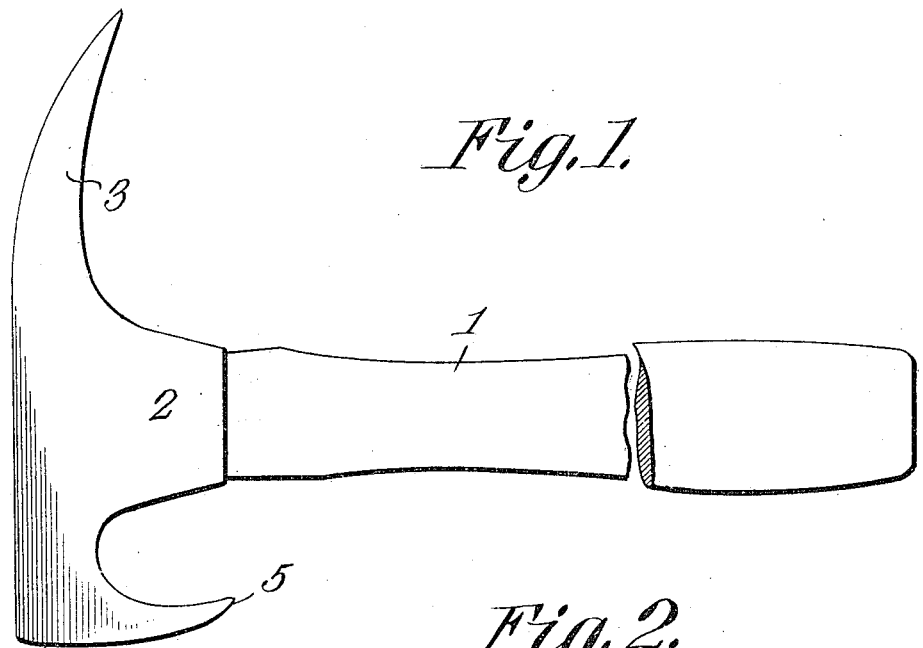
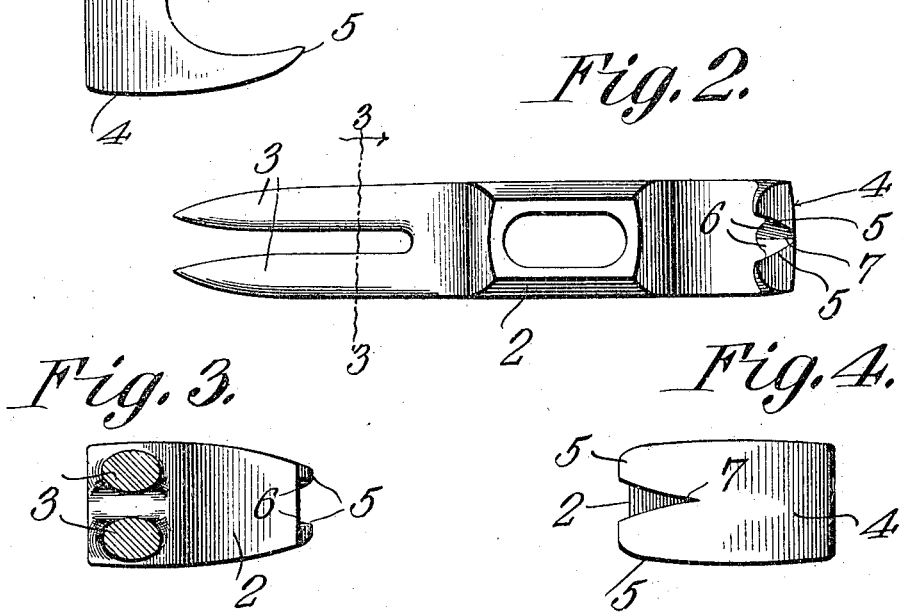
WITNESSES:
William S. Guinter,
INVENTOR.
By C. A. Snow & Co.
ATTORNEYS

UNITED STATES PATENT OFFICE.

WILLIAM S. GUINTER, OF JEFFERSON, WISCONSIN.

COMBINED FENCE-MAKING TOOL.

No. 839,474.  Specification of Letters Patent.  Patented Dec. 25, 1906.

Application filed October 23, 1906. Serial No. 340,198.

*To all whom it may concern:*

Be it known that I, WILLIAM S. GUINTER, a citizen of the United States, residing at Jefferson, in the county of Green and State of Wisconsin, have invented a new and useful Combined Fence-Making Tool, of which the following is a specification.

This invention has relation to a combination-tool especially adapted for use in building and taking down wire fences; and it consists in the novel construction and arrangement of its parts as hereinafter shown and described.

The object of the invention is to provide a tool which embraces a staple-puller, nail-puller, wire grip and stretcher, and hammer. The tool is mounted upon a handle and is provided at one end with a pair of tines which are spaced apart in parallel relation near their inner ends and diverge from each other at their outer ends, which are pointed. The said tines are ovate in transverse section. At the opposite side of the head of the tool from the tines a hammer is provided, from the lower edge of which extend a pair of claws. The tines may be used for drawing a staple without disfiguring the shape of the same and without permitting the staple to become wedged between them. The hammer may be used for all purposes that such an implement is usually used for. The claws may be used for gripping a wire and for starting to draw a nail, while the tines may be used for finishing the drawing of heavy nails. The combined parts may be employed for stretching a wire, as will be hereinafter explained.

In the accompanying drawings, Figure 1 is a side elevation of the implement. Fig. 2 is an edge view of the same. Fig. 3 is a sectional view of the same cut on the line 3 3 of Fig. 2, and Fig. 4 is an end view of the same.

The implement comprises the handle-stock 1, which enters the eye of the head 2. The said head is provided at one side with the curved tines 3 3, which are pointed at their outer ends and which are ovate in transverse section. The said tines at their inner ends are spaced apart in parallel relation; but the space between their outer ends gradually increases toward the points. The opposite side of the head 2 is provided with a hammer 4, from the lower edge of which the claws 5 5 depend. The said claws are provided with the beveled inner sides 6 and are separated by the V-shaped space 7.

For drawing a staple the implement is used as follows: The point of one of the tines 3 is inserted under the staple, and then by striking upon the end of the hammer 4 the tine is driven under the staple, which is lifted out of the wood, but, owing to the shape of the tine, is not twisted or mutilated, nor does it become wedged between the tines. Should the staple be long and still remain in the wood when the inner end of the tine has been forced thereunder, the operator may grasp the handle 1 and use that portion of the head 2 upon which the hammer 4 is located as a fulcrum for prying the staple from its seat. The said tines may also be used for drawing heavy nails or for drawing long nails that have been started.

The claws 5 5, having the beveled inner side and separated by a V-shaped space, may be used for starting the withdrawal of nails. Also a wire may be caught in the V-shaped space between the edges of the claws, and thus the said claws may operate as a wire-grip, and when a wire is so attached to the claws the ends of the tines 3 may be placed against the side of a post, and by using the handle 1 of the lever and the ends of the tines 3 as a fulcrum the wire may be stretched across the post and fixed with relation thereto by means of a staple.

Having described my invention, what I claim as new, and desire to secure by Letters Patent, is—

1. A tool of the character indicated comprising a handle, a head attached thereto and having at one side curved tines pointed at their outer ends, said tines being in ovate transverse section, said tines being spaced apart at their inner ends in parallel relation and diverging from each other at their outer ends, said head having at its side opposite the tines a hammer.

2. An implement of the character indicated comprising a handle, a head attached thereto and having at one side curved tines pointed at their outer ends and ovate in transverse section, said tines being spaced apart and being parallel at their inner ends and diverging from each other at their outer ends, the head having at its side opposite the tines a hammer the lower edge of which is provided with depending claws which have beveled inner sides and which are separated by a V-shaped space.

In testimony that I claim the foregoing as my own I have hereto affixed my signature in the presence of two witnesses.

WILLIAM S. GUINTER.

Witnesses:
BLANCHE WUNSCHEL,
SARAH C. OSTRANDER.